(12) United States Patent
Eatedali et al.

(10) Patent No.: US 10,765,955 B2
(45) Date of Patent: Sep. 8, 2020

(54) VIDEO GAME NOTIFICATIONS FOR STREAMING GAMES

(71) Applicants: Josiah Eatedali, Los Angeles, CA (US); Robert Schonfeld, Sherman Oaks, CA (US)

(72) Inventors: Josiah Eatedali, Los Angeles, CA (US); Robert Schonfeld, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 15/960,353

(22) Filed: Apr. 23, 2018

(65) Prior Publication Data
US 2019/0192979 A1 Jun. 27, 2019

Related U.S. Application Data

(60) Provisional application No. 62/610,800, filed on Dec. 27, 2017.

(51) Int. Cl.
| | | |
|---|---|---|
| *A63F 9/24* | (2006.01) | |
| *A63F 11/00* | (2006.01) | |
| *G06F 13/00* | (2006.01) | |
| *G06F 17/00* | (2019.01) | |
| *A63F 13/86* | (2014.01) | |
| *A63F 13/35* | (2014.01) | |
| *A63F 13/795* | (2014.01) | |
| *A63F 13/352* | (2014.01) | |
| *A63F 13/79* | (2014.01) | |
| *A63F 13/63* | (2014.01) | |

(52) U.S. Cl.
CPC .............. *A63F 13/86* (2014.09); *A63F 13/35* (2014.09); *A63F 13/352* (2014.09); *A63F 13/795* (2014.09); *A63F 13/63* (2014.09); *A63F 13/79* (2014.09)

(58) Field of Classification Search
USPC .................. 463/1, 20, 22, 25, 30, 39, 42
See application file for complete search history.

(56) References Cited

U.S. PATENT DOCUMENTS

| | | | | |
|---|---|---|---|---|
| 7,311,608 | B1 * | 12/2007 | Danieli | A63F 13/12 463/42 |
| 2006/0281541 | A1 * | 12/2006 | Nguyen | G07F 17/32 463/25 |
| 2008/0090659 | A1 * | 4/2008 | Aguilar | A63F 13/12 463/42 |
| 2015/0310703 | A1 * | 10/2015 | Katz | G07F 17/3244 463/25 |

* cited by examiner

*Primary Examiner* — Adetokunbo O Torimiro
(74) *Attorney, Agent, or Firm* — Klein, O'Neill & Singh, LLP

(57) ABSTRACT

Users may request notification of occurrence of video game play events. Upon occurrence of the video game play events, the users may be provided access to live streams of play of the video games. In some embodiments the video game play events may occur across play of a multitude of video games using a multitude of game hosts, including in some embodiments different video games, and play of the video games may be at unscheduled times.

17 Claims, 10 Drawing Sheets

VIDEO GAME NOTIFICATIONS FOR STREAMING GAMES

CROSS REFERENCE TO RELATED APPLICATION

This application claims the benefit of the filing date of U.S. Provisional Patent Application No. 62/610,800, filed on Dec. 27, 2017, the disclosure of which is incorporated by reference herein.

BACKGROUND OF THE INVENTION

The present invention relates generally to video games, and more particularly to distribution of live video game play to viewers.

Video games provide fun and enjoyment for many. Video games allow users to participate in a variety of simulated activities. Video games allow users to perform roles and experience activities that the users may not be able or desire to experience directly, whether due to cost, danger, or equipment concerns, or simply due to a role or activity being a fantasy.

At times a particular user may have difficulties accomplishing various tasks during play of a video game. Those tasks may have been successfully accomplished by others. Indeed, the particular user may know or know of other players that have accomplished those tasks, or are believed to have sufficient skill to be able to easily surmount those tasks. Unfortunately, the particular user may not have access to information as to how the other players approached or accomplished those tasks.

Moreover, the nature of the tasks may change dynamically over time, in for example player against player competitions (including multi-player against multi-player competitions) as different players independently arrive at use of different tactics and stratagems. A particular user may have little opportunity to stay up-to-date as to various approaches the user or the user's potential opponents may take.

BRIEF SUMMARY OF THE INVENTION

Some embodiments in accordance with aspects of the invention provide for notifications of occurrence of unscheduled video game play events. In some embodiments the unscheduled video game play event is video game play including one or more preidentified players. In some embodiments the unscheduled video game play event is video game play including a preidentified video game. In some embodiments the unscheduled video game play event is video game play including preidentified video game modes or video game maps.

In some embodiments the notifications include information as to how one may view the video game play. In some embodiments the information is a link to a live stream for the video game play. In some embodiments the information is a link that may be used to request transmission of a stream of video (or audio and video) of video game play to a device and/or video game state information to a device. In some embodiments a number of recipients of the stream of video game play or video game state information is maintained, and in some embodiments provided to game devices used in play of the video game, for example for display to the video game players. In some embodiments a number of the recipients who also requested the notifications is instead or in addition maintained, and in some embodiments provided to the game devices used for play, for example for display to the video game players.

In some embodiments the unscheduled video game play events occur in any of a plurality of sets of active video games. In some embodiments the number of sets may vary over time. Moreover, the sets of active video games may be open sets in some embodiments, with a number of active video games in a particular set also varying over time in some embodiments.

In some embodiments a server receives requests for notifications of occurrence of video game play events from a plurality of users, monitors status of video game play for a plurality of video games for occurrence of the video game play events, and provides a notification to the users in response to occurrence of the video game play events.

In some embodiments a server receives requests for notifications of occurrence of video game play events from a plurality of users, receives information from a plurality of matchmaking servers regarding video game play matchings, monitors the information regarding video game play matchings for occurrence of video game play events, and provides a notification to the users in response to the occurrence of the video game play events. In some embodiments the server collates the requests for notification by the video game play events, and determines a number of requests for each event. In some embodiments the server collates the requests for notifications by video game play including particular players, and in some embodiments whether the video game players are to play cooperatively with one another or in opposition, and determines a number or requests for each such event. In such embodiments the server may provide the number of requests to a matchmaking server, with the matchmaking server utilizing the information in matching video game players for play.

In some embodiments a server receives requests for notifications of occurrence of video game play events from a plurality of users, receives information from video game hosts that play of a video game is to begin, and transmits information regarding the requests for notifications of occurrence of video game play events to the video game hosts, for monitoring status of video game play for occurrence of the video game play events by the video game hosts.

In some embodiments a server receives request for notifications of occurrence of video game play events from a plurality of users, receives information from one, or more in some embodiments, video game stream aggregators regarding upcoming and/or occurring video game matches, and provides notifications to the plurality of users if the information on the requests for notifications corresponds to information of the video game matches. In some embodiments the server may be the video game stream aggregator.

Some embodiments in accordance with aspects of the invention provide a method of providing notifications to users of occurrence of video game play events, comprising: receiving a plurality of requests for notification of occurrence of video game play events from a plurality of users, each of the requests for notification specifying a video game play event and including an identification of the user making the request; storing information of the requests for notification of occurrence of video game play events; determining whether information regarding play of a plurality of video games matches the information of the requests for notification of occurrence of video game play events; and in response to determining the existence of a match, providing a notification to particular ones of the plurality of users that the video game play event for which the particular ones of the plurality of users has requested notification has occurred.

These and other aspects of the invention are more fully comprehended upon review of this disclosure.

DETAILED DESCRIPTION

Figure 1:
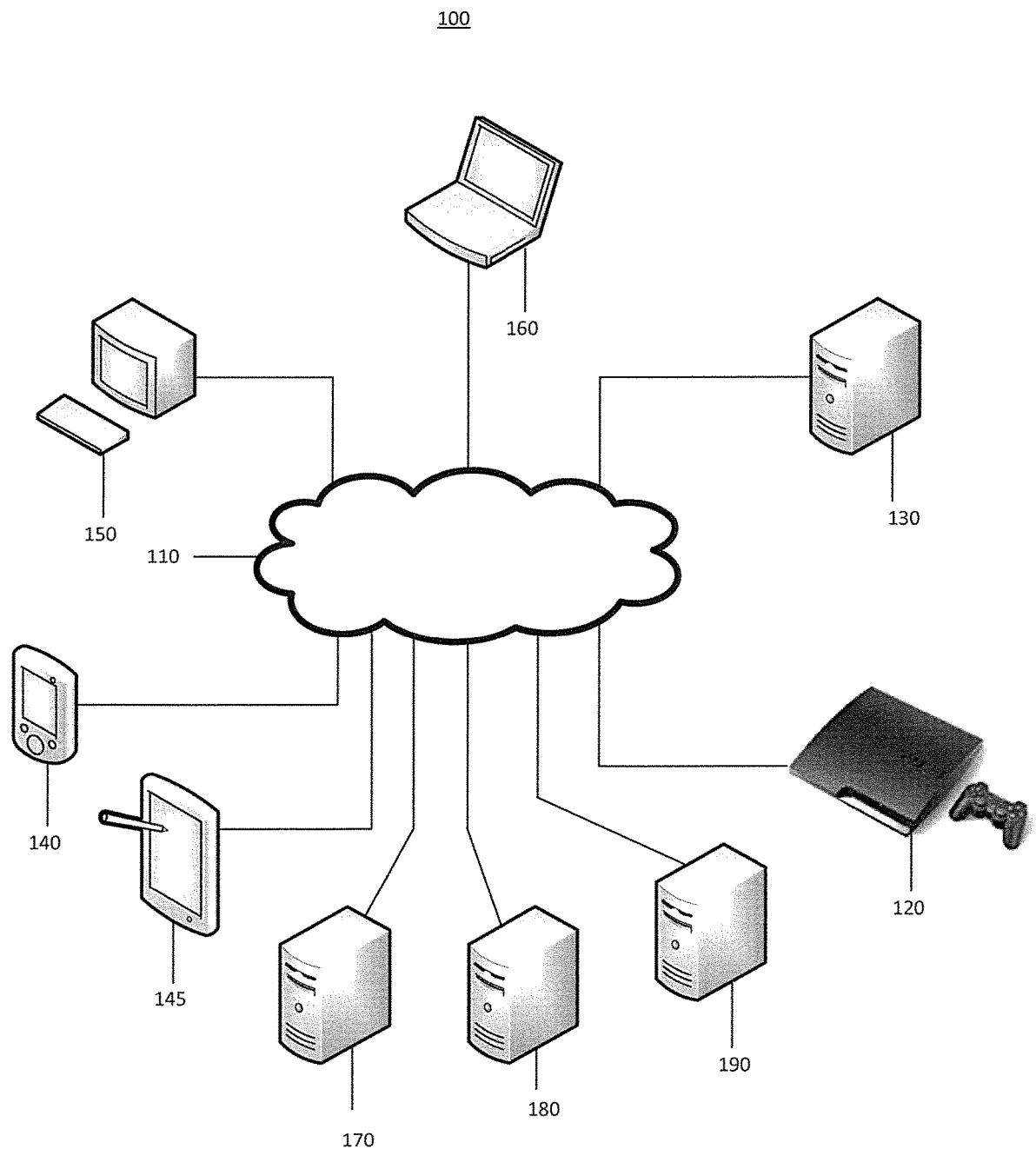
FIG. 1 illustrates a system providing for notification of occurrence of video game play events in accordance with aspects of the invention.

FIG. 1 illustrates an exemplary system providing for notification of occurrence of video game play events in accordance with aspects of the invention. The system provides for video game play, with monitoring of game play events, and provision of notifications in response to occurrence of events. In some embodiments the notifications allow users to view on-going video game play of video games to which the notifications relate.

The system of FIG. 1 shows a plurality of gaming platforms 120 and 140-160. The gaming platforms may comprise various compute devices suitable for executing videogames and communicating over communication network 110. In various embodiments the gaming platforms, and the number of gaming platforms, may be different than as shown in the example system of FIG. 1.

In FIG. 1, the system includes a first gaming platform 120, which is a videogame console. Examples of videogame consoles include the Microsoft Xbox, Sony PlayStation, and Nintendo Wii U. In addition to the videogame console, gaming platforms may comprise any other suitable compute devices such as mobile devices (e.g., smartphone 140, tablet 145) and personal computers (e.g., desktop computer 150 and laptop computer 160). The gaming platforms each have one or more processors, memory, communication circuitry, and associated hardware. The gaming platforms may communicate with other gaming platforms by sending and receiving data through communication network 110, which may comprise private and public networks. In many embodiments, the communication network comprises the Internet.

The gaming platforms are configured for play of video games, in particular multiplayer video games in which multiple players play a video game using different gaming platforms communicating over the communication network. In some embodiments the gaming platforms, or some of them, may also be configured for hosting multiplayer video games. In hosting multiplayer video games, the gaming platform may receive and distribute game play state information from and amongst various others of the gaming platforms for a common video game being played using the others of the gaming platforms, and optionally also the gaming platform.

The system further includes one or more servers, with a first server 130, a second server 170, a third server 180, and a fourth sever 190 illustrated in FIG. 1. The first server may a notification server, used in a process for generating game event notifications. The second server may be a game server. The game server may comprise modules that provide certain services useful with respect to video game play. The modules may include, for example, a matchmaking module, social networking module, data collection module, user profile module, authentication/security module, a communication module, and an online store module. The matchmaking module may generate matches for multiplayer video game play between users operating the various gaming platforms. The communication module may provide for collection and distribution of game state information for multiplayer video game play hosted by the game server. In some embodiments the game server may also perform some or all of the functions of the notification server and/or matchmaking server. The third server may be a matchmaking server. Although functions of the matchmaking server may also or instead be provided by a game server, as indicated above with respect to the matchmaking module of the game server, in some embodiments some of the modules that may be present on a game server may instead be independently provided by a separate server. The fourth server may be a stream aggregator server. The stream aggregator server streams video game play information to viewers, allowing the viewers to view play of video games. In some embodiments the stream aggregator server streams video information, and in some embodiments audiovisual information, to the viewers. In some embodiments the stream aggregator server may provide additional information as well, for example comments, commentary, and/or statistics relating to play of the video game. In some embodiments the stream aggregator server may also perform some or all of the functions of the notification server and/or the matchmaking server.

The system of FIG. 1, as illustrated, includes only a limited number of gaming platforms and servers. In most implementations the system would include many more gaming platforms and servers. For example some implementations may include thousands of gaming platforms, each configured for play at different times of potentially multiple different video games, or different aspects of the same video game. In such a system, some multiplayer video games may be hosted by gaming platforms, while other video games may be hosted by game servers, and the various video games may be played during different time periods, starting and ending generally as users desiring to play the video games may see fit.

In some embodiments the notification server is configured to receive requests from users for notification of occurrence of video game play events, and stores those notifications. In some embodiments the requests are for notification of occurrence of a play of a particular video game by a particular video game player. In some embodiments the requests are for notification of occurrence of play of a match involving or between two, or more than two, particular video game players for a particular video game. In some embodiments the requests are for notification of occurrence of play of a particular video game. In some embodiments the requests are for notification of occurrence of play of a particular mode of a particular video game, or play involving a particular map of a particular video game.

In some embodiments the notification server stores the requests, including information identifying the requestor, in a database. In some embodiments the notification server has multiple databases for storing requests. In some embodiments the notification server comprises a plurality servers, for example data coupled together. In some embodiments the notification server stores the requests in a format or data structure suitable for reading by other computer devices which are not configured for execution of database information access programs.

In some embodiments the notification server is configured to receive information regarding matches for video game play, for example from the matchmaking server, or from the game server or a gaming platform configured to serve as a host for multiplayer video game play. In some embodiments the information regarding matches comprises a video game to be played. In some embodiments the information regarding matches comprises a video game to be played and information regarding identities of game players to play the video game. In some embodiments the information regarding matches comprises information specifying a mode of a video game to be played and/or information specifying a map of a video game involved in play of the video game. In some embodiments the information regarding matches also includes an identification of a game server or gaming platform hosting the match.

In some embodiments the information regarding matches is information regarding one or more states of an on-going match. In some embodiments the information regarding one or more states of an on-going match may consist of or be comprised of one or more of a mission, a character level, a number of players, an amount of remaining life, an amount of remaining time, and a score differential of the on-going match. In some embodiments a video game executing on a video game platform is configured to provide the information regarding states of the on-going match. In some such embodiments the video game sets flags, which can be considered metadata, indicating the information based on a state of then on-going game play, and provides the flags, for example to the notification server or other server. In some embodiments a game host is configured to provide the information regarding states of the on-going match, for example based on game state information which the game host receives from one gaming platform and is to distribute to another gaming platform. In some embodiments a particular one of the flags is set whenever a change in state of the information reflected by the flag changes or, in some embodiments, whenever a change in state of the information reflected by the flag changes by a predetermined amount, or to a predetermined value.

In some embodiments the notification server searches the database(s) storing the requests to determine if the information regarding matches corresponds to one or more requests in the database(s). (In this regard, it is noted that the phrase "corresponds to" may mean "matches", as in a first data item has a "match" in a database search, but to help avoid confusion between "matches for video game play" and matches in database searches, sometimes the phrase "corresponding to" or "correspondence", or "database match" may be at times be used herein). In the event of correspondence between the match information and a request, the notification server provides a notification to the requestor indicating the correspondence. In some embodiments the notification includes a link to or information identifying the host for the video game match. In some embodiments the notification includes information so that the requestor may view a live stream of play of the video game match.

In some embodiments the notification server provides information of the requests to the host for the video game match, and the host determines if the information of the requests corresponds to the information regarding the video game match. In some such embodiments the notification server may only provide some of the information of the requests, for example information of requests pertaining only to the video game of the video game match. In some such embodiments the host provides a notification to the requestor indicating the correspondence, and in some embodiments the notification provides a link or other information identifying the host or providing access to a viewing of a live stream of play of the video game match.

In some embodiments the notification server, or some other server, stores the information regarding matches in a further database. In some embodiments the information regarding matches stored in the further database is only information regarding states of an on-going match. In some embodiments the information regarding matches stored in the further database is information of flags, or metadata, set by a video game platform executing a video game, or in some embodiments a game host. In some such embodiments the notification server, or the some other server, searches the further database for correspondence between the information regarding matches and a request. In some embodiments the search of the further database is only for correspondence between information regarding then on-going matches and a request. In some embodiments, the notification server, or some other server, provides notifications for each of the correspondences, or, in some embodiments, a single notification listing all of the correspondences.

Figure 2:
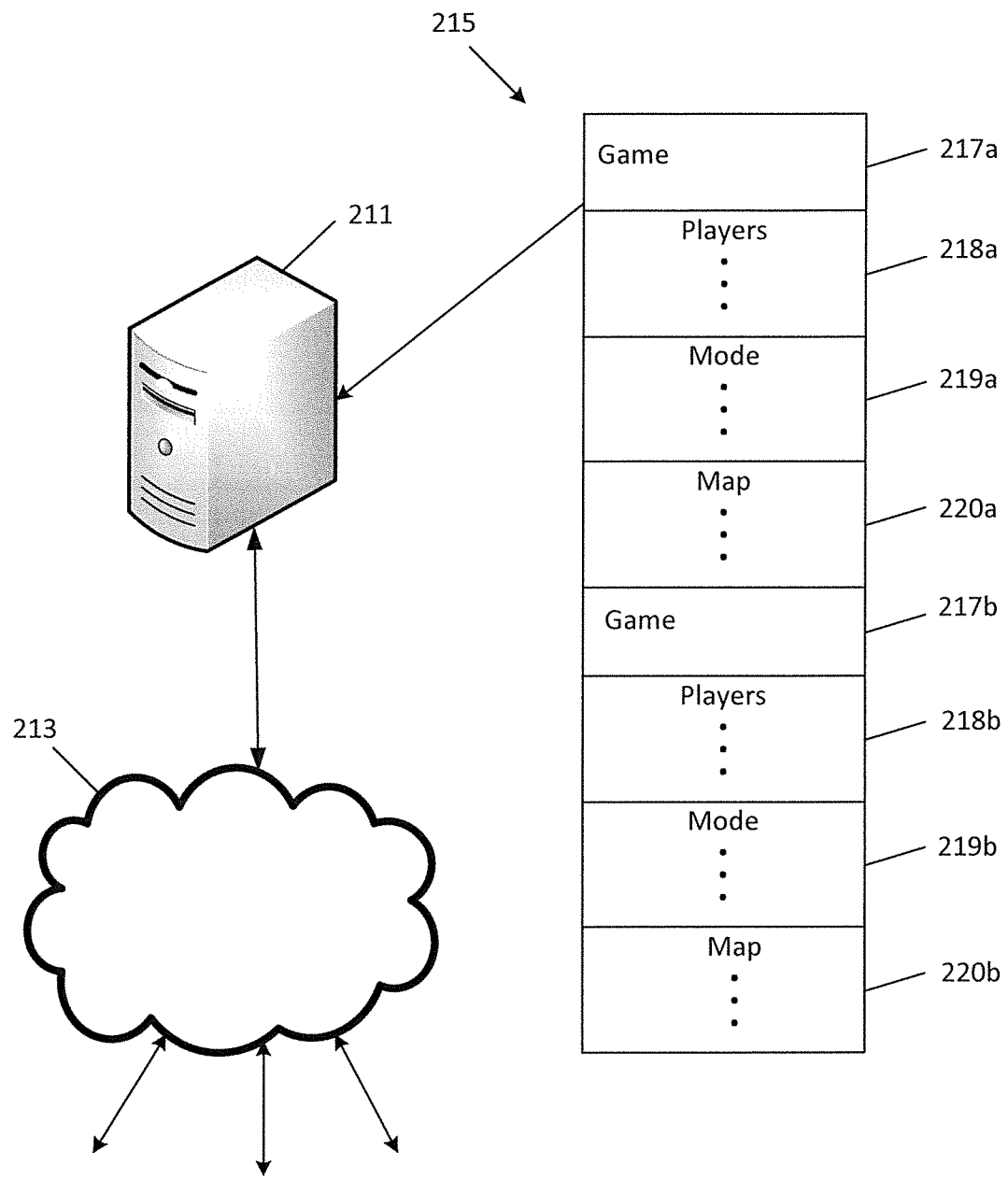
FIG. 2 illustrates a semi-block diagram showing aspects of a system for storing requests for notifications of occurrence of video game play events in accordance with aspects of the invention.

FIG. 2 illustrates a semi-block diagram showing aspects of an example system for storing requests for notifications of occurrence of video game play events in accordance with aspects of the invention. In particular, FIG. 2 shows a notification server 211 coupled to a communications network 213. In some embodiments the notification server 211 is a notification sever as discussed with respect to FIG. 1. In some embodiments the communications network 213 is the Internet.

The notification server receives requests for notifications of occurrence of video game events. The requests are received over the communications network. In various embodiments the requests are the requests as discussed with respect to FIG. 1. In some embodiments the requests identify a requestor and identify particular game events for which notifications are desired. In some embodiments the particular game events are one, some, or all of play of a particular video game, participation of particular players in play of a video game, and/or play of a particular mode or map of a particular video game. In some embodiments the participation of particular players may also be specified as the particular players being in competition with one another, or acting in competition with one another, or either.

The notification stores information of the requests. In some embodiments the information of the requests is stored in a database 215, or a plurality of databases. In some embodiments the information of the request is stored in a searchable data format, which may or may not be considered a database. For the example system of FIG. 2, the database includes request information on a per video game basis, with for example request information for a first video game 217*a* and a second video game 217*b*. For simplicity, only request information for two video games are shown in FIG. 2, in many implementations there may be request information for more video games, and in many cases many more video games.

For each video game, the request information shown in FIG. 2 includes records or fields for player related request information 218*a,b*, mode related request information 219*a, b*, and map related request information 220*a,b*. There may be a plurality of records or fields in each category, with each representative of a single request for notification, and with each associated with or including an identification of a requestor to whom a notification should be sent on occurrence of the requested event.

In this regard, in some embodiments the notification server may transmit information of the database to other computer devices, for example game servers and gaming platforms hosting play of a video game. The other computer devices may then utilize the information to determine whether an event occurs for which notification is requested. In some embodiments the game server or gaming platform may provide the notification to the requestor. In some embodiments the game server or gaming platform may provide a message to the notification server of occurrence of an event for which notification is requested, with the notification server providing the notification to the requestor. In such embodiments, information as to identities of requestors may not be provided to the game servers and gaming platforms.

In some embodiments the notification server may receive information regarding games, game players, and modes and maps for game play from a matchmaking server, or from game servers and gaming platforms. In such embodiments the notification server may determine whether an event occurs for which notification is requested, and provide the notification to the requestor.

Figure 3:
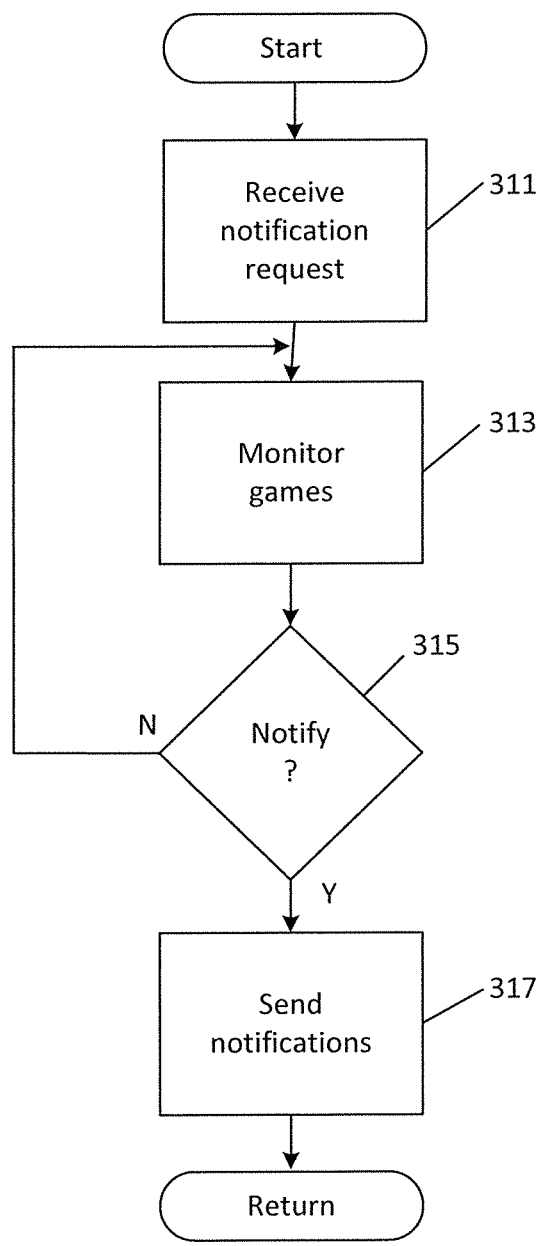
FIG. 3 is a flow diagram of a process for providing notifications of occurrence of video game play events in accordance with aspects of the invention.

FIG. 3 is a flow diagram of a process for providing notifications of occurrence of video game play events in accordance with aspects of the invention. In some embodiments the process is performed by the system of FIG. 1. In some embodiments the process is performed by the notification server of FIG. 1 or FIG. 2, or a server or a gaming platform of the system of FIG. 1. In some embodiments the process is performed by a game server, for example the game server of FIG. 1 In some embodiments the process or parts of the process is performed by a processor executing program instructions, for example a processor of a server or gaming platform of the system of FIG. 1.

In block 311 the process receives a notification request. The notification request may be made by a user, who may for example be uniquely identified by a game player identifier or by some other unique identifier. In some embodiments the notification request is a request for a notification of an occurrence of a video game play event. In some embodiments the particular game play events are one, some, or all of play of a particular video game, participation of particular players in play of a video game, and/or play of a particular mode or map of a particular video game. In some embodiments a request for notification of participation of particular players in play of the particular video game may specify whether the particular players are to be in competition with each other, or in a cooperative relationship with one another, or either. In some embodiments the notification request is a request for currently playing video games with one or more game states that match a predefined criteria. In some embodiments the notification request is received by a notification server, for example as discussed with respect to FIG. 1 or FIG. 2.

In block 313 the process monitors game information. In some embodiments the game information is information about play of video games that is soon to begin or has recently begun. In some embodiments the game information comprises one, some, or all of a video game to be (or being) played, players to play (or playing) the video game, and/or a particular mode or map to be involved (or involved) in play of a video game. In some embodiments the game information instead or in addition comprises information indicative of game states, or some of it, of a video game being played. For example, in some embodiments a gaming platform or a game host may set and provide flags, indicative of predetermined aspects of video game play, during play of the video game.

In some embodiments a game host, or multiple game hosts, monitors the game information for occurrence of events for which notification has been requested. In some embodiments a matchmaking server and/or a game host, and in many embodiments many matchmaking servers and/or game hosts, provides the game information to a notification server, which monitors the game information for occurrence of events for which notification has been requested.

In block 315 the process determines if an event has occurred for which notification has been requested, and/or in some embodiments whether then being played video games match a predefined criteria of a notification request. If not, the process returns to block 313 and continues to monitor the game information for occurrence of events for which notification has been requested. Otherwise the process continues to block 317.

In block 317 the process provides a notification of occurrence of an event for which notification has been requested, and/or of then being played video games which match the predefined criteria of a notification request. In some embodiments the notification server provides the notification, and in some embodiments a game host provides the notification. In most embodiments the notification is provided to the user who requested the notification. In some embodiments the notification is transmitted over the communication network to the user. In some embodiments the notification includes information regarding the event for which notification was requested. In some embodiments the information is information as to how the user may obtain a live stream of video game play for play of the video game match for which the game play event has occurred. In some embodiments the information is information as to how the user may view game play from within execution of a video game program executing on the user's gaming platform. In such embodiments the game server for play of the video game may provide game state information over the Internet to the gaming platform. In some embodiments the notification is sent to a first computer device, for example a smartphone, and viewing of the video game may be accomplished on a second computer device, for example a gaming platform. In some embodiments the notification may be sent to both the first computing device and the second computing device.

The process thereafter returns.

Figure 4:
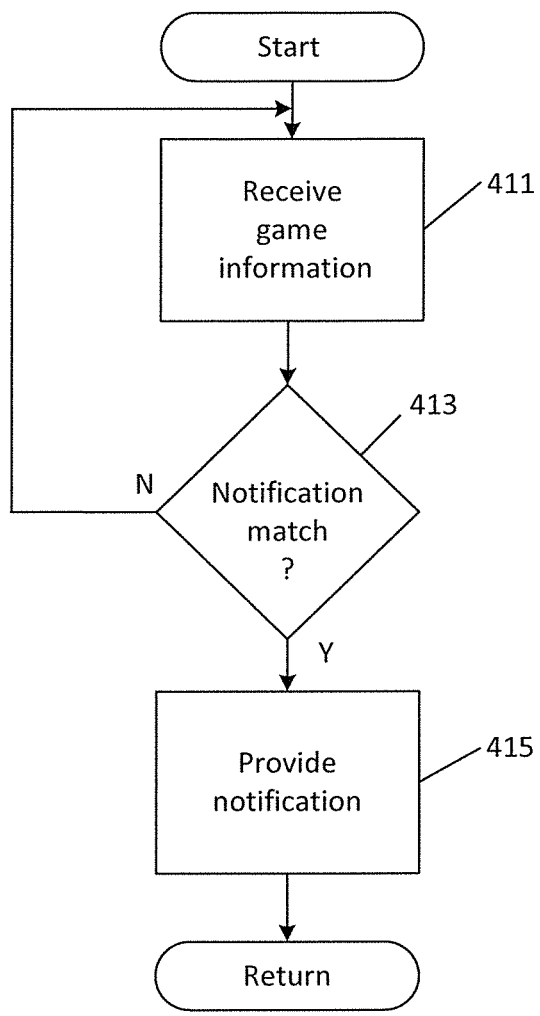
FIG. 4 is a flow diagram of a server-based process for providing notifications of occurrence of video game play events in accordance with aspects of the invention.

FIG. 4 is a flow diagram of a server-based process for providing notifications of occurrence of video game play events in accordance with aspects of the invention. In some embodiments the process is performed by the system of FIG. 1. In some embodiments the process is performed by the notification server of FIG. 1 or FIG. 2. In some embodiments the process or parts of the process is performed by a processor executing program instructions, for example a processor of a server of the system of FIG. 1. In some embodiments the process performs operations of blocks 313-317 of the process of FIG. 3.

In block 411 the process receives game information. In some embodiments the process receives information regarding a video game to be played and players to play the video game from a matchmaking server. In some embodiments the process instead or in addition receives game state information, or information indicative of game state, of video games being played from game hosts or, in some embodiments, game platforms.

In block 413 the process determines if the game information matches information of a request for notification of occurrence of a video game play event. In many embodiments there may be many different requests for notification for the same and/or different video game play events, and the requests may be from many different users, some of whom may have submitted multiple different requests. In some embodiments video game play event is play of a particular video game. In some embodiments the video game play event is play by particular players of a particular video game. In some embodiments the video game play event is play in a particular mode or of a particular map of a particular video game.

If the process determines that the game information matches information of a request for notification of occurrence of a video game play event, the process continues to operations of block 415. Otherwise the process returns to operations of block 411.

In block 415 the process provides a notification to a user who has requested notification of occurrence of the video game play event. In some embodiments multiple users may have requested notification of occurrence of the same video game play event, and the process provides a notification to each of those users. In some embodiments the notification includes information as to the video game play event for which notification was requested, and in some embodiments the notification includes information relating to how the user may view a live stream of play of the video game which triggered the notification.

The process thereafter returns.

Figure 5:
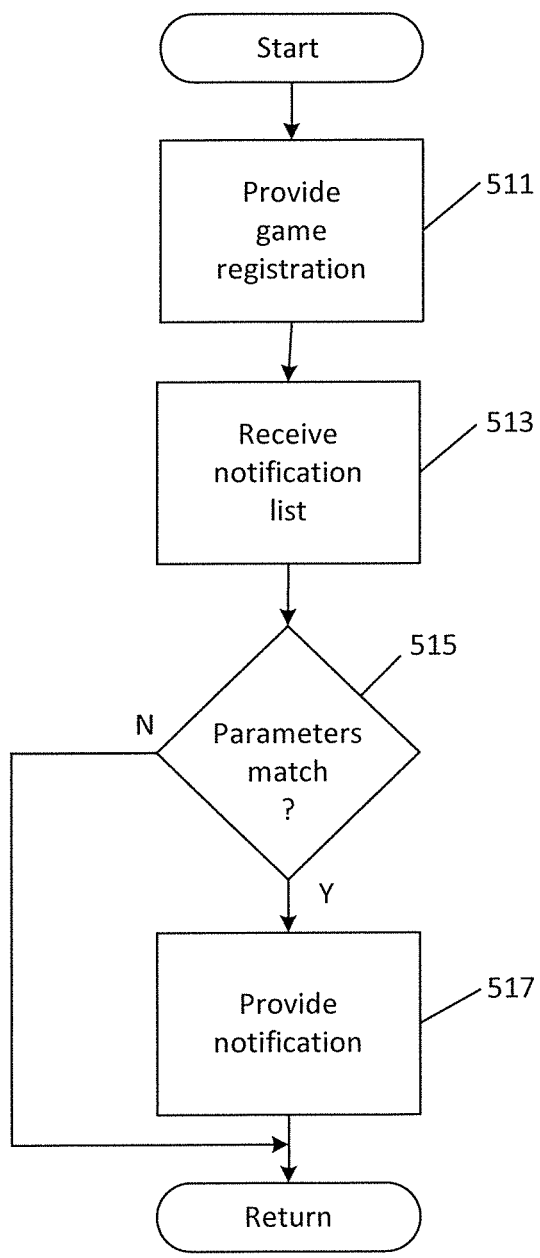
FIG. 5 is a flow diagram of a host-based process for providing notifications of occurrence of video game play events in accordance with aspects of the invention.

FIG. 5 is a flow diagram of a host-based process for providing notifications of occurrence of video game play events in accordance with aspects of the invention. In some embodiments the process is performed by the system of FIG. 1. In some embodiments the process is performed by a game server or a gaming platform of the system of FIG. 1. In some embodiments the process or parts of the process is performed by a processor executing program instructions, for example a processor of a game server or gaming platform of the system of FIG. 1. In some embodiments the process performs operations of blocks 313-317 of the process of FIG. 3.

In block 511 the process provides an indication that play of a video game is to begin. In some embodiments the indication is provided to a notification server, for example the notification server of FIG. 1 or FIG. 2. In some embodiments the indication includes information as to the video game to be played, and information as to a game host hosting the video game to be played.

In block 513 the process receives information as to video game play events for which notification has been requested, and information regarding identities of users who have requested the notifications. In some embodiments the information is provided by the notification server, and in some embodiments the notification server provides the information in response to receiving the indication that play of the video game is to begin.

In block 515 the process determines if aspects of play of the video game match, or correspond to, video game play events for which notification has been requested. In some embodiments the process makes the determination prior to a beginning of play of the video game, for example based on information as to the video game to be played, the players to play the video game, a mode of the video game to be played, or a map to be used during play of the video game. In some embodiments the process instead or in addition makes the determination during play of the video game match, for example based on game state information developed during play of the video game. For example, in some embodiments different players play the video game with and/or against each other, with each of the different players using different gaming platforms. The different gaming platforms may each provide changes to video game state information resulting from play on the gaming platform to the game host, which distributes the changes to video game state information to the various gaming platforms. In such embodiments, the game host may monitor the game state information received from the gaming platforms for an indication that a video game play event has occurred for which notification has been requested.

If the process determines that there has been or is a match with a video game play event for which notification has been requested, the process proceeds to block 517, otherwise the process returns.

In block 517 the process provides a notification to a user who has requested notification of occurrence of the video game play event. In some embodiments multiple users may have requested notification of occurrence of the same video game play event, and the process provides a notification to each of those users. In some embodiments the notification includes information as to the video game play event for which notification was requested, and in some embodiments the notification includes information relating to how the user may view a live stream of play of the video game which triggered the notification. In some embodiments the information relating to how the user may view the live stream of play of the video game comprises information allowing the user to request being provided game state information from the game host during play of the video game.

The process thereafter returns.

Figure 6:
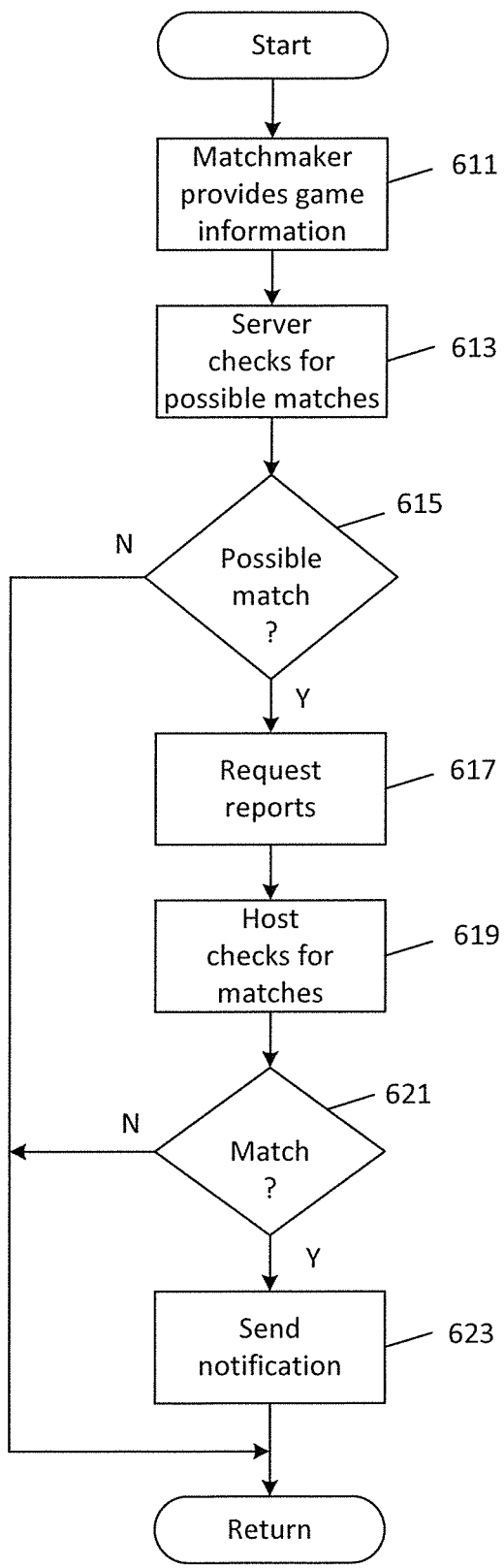
FIG. 6 is a flow diagram of a distributed process for providing notifications of occurrence of video game play events in accordance with aspects of the invention.

FIG. 6 is a flow diagram of a distributed process for providing notifications of occurrence of video game play events in accordance with aspects of the invention. In some embodiments the process is performed by the system of FIG. 1. In some embodiments the process is performed by the notification server of FIG. 1 or FIG. 2, a matchmaking server of the system of FIG. 1, and a game server or a gaming platform of the system of FIG. 1. In some embodiments the process or parts of the process is performed by processors executing program instructions, for example processors of the notification server, matchmaking server, and game server or gaming platform of the system of FIG. 1. In some embodiments the process performs operations of blocks 313-317 of the process of FIG. 3.

In block 611 the matchmaking server provides information relating to play of a video game. In some embodiments the matchmaking server provides the information to a notification server. In some embodiments the matchmaking server matches game players for play of a video game, and in some embodiments also identifies a game host, for example a game server or a gaming platform, for play of the video game. In such embodiments the matchmaking server may provide information as to the video game to be played, the players to play the video game, and, in some embodiments, a game host for play of the video game.

In block 613 the notification server compares the information relating to game play received from the matchmaking server with information of requests for notification of game play events.

In block 615 the notification server determines if the information received from the matchmaking server indicates a possible match with information of requests for notification of game play events. For example, the matchmaking server may indicate that the video game to be played is a particular first person shooter video game, and the notification server may have received a request for notification of play of that video game, with at least one player having a particular item of equipment as part of a load out for a character in the video game, for example to be used during game play by a character in the video game. In such a circumstance, there is a possible match with information of a request for notification, but the notification server may have insufficient available information to determine if there is an actual match. In other circumstances, the notification server may have received sufficient information from the matchmaking server that there is an actual match, and in some embodiments the process may also consider such a circumstance to be a possible match.

If there is a possible match the process proceeds to block 617, otherwise the process returns.

In block 617 the notification server provides the game host information of requests for notification of game play events that may possibly match information of the video game to be played, or being played. In some embodiments the information includes the events for which notification has been requested, and an identification of the requesters for those events.

In blocks 619 and 621 the game host determines if aspects of play of the video game match, or correspond to, video game play events for which notification has been requested, using the information of requests provided by the notification server. In some embodiments the game host makes the determination based on information available prior to the start of game play, for example based on initial game state information for play of the video game. In some embodiments the game host instead or in addition makes the determination based on then current game state information throughout play of the video game.

If the game host determines that there has been or is a match with a video game play event for which notification has been requested, the process proceeds to block 623, otherwise the process returns.

In block 623 the game host provides a notification to a user who has requested notification of occurrence of the video game play event. In some embodiments multiple users may have requested notification of occurrence of the same video game play event, and the process provides a notification to each of those users. In some embodiments the notification includes information as to the video game play event for which notification was requested, and in some embodiments the notification includes information relating to how the user may view a live stream of play of the video game which triggered the notification. In some embodiments the information relating to how the user may view the live stream of play of the video game comprises information allowing the user to request being provided game state information from the game host during play of the video game.

The process thereafter returns.

Figure 7:
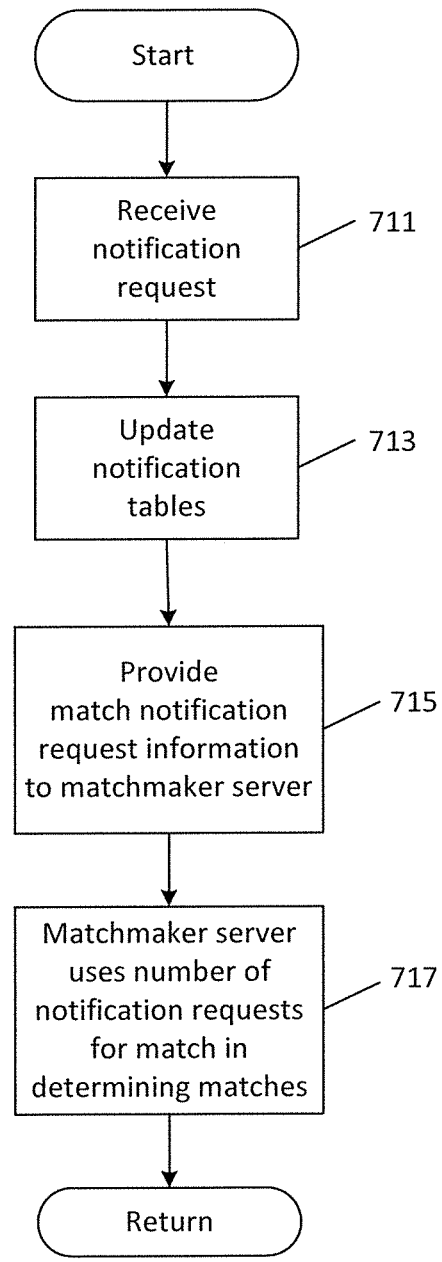
FIG. 7 is a flow diagram of a process useful in determining participants for video game matches which viewers wish to view.

FIG. 7 is a flow diagram of a server-based process for providing notifications of occurrence of video game play events in accordance with aspects of the invention. In some embodiments the process is performed by the system of FIG. 1. In some embodiments the process is performed by the notification server of FIG. 1 or FIG. 2, in conjunction in some embodiments with a matchmaking server, for example the matchmaking server of FIG. 1. In some embodiments the process or parts of the process is performed by one or more processors executing program instructions, for example a processor of a server of the system of FIG. 1.

In block 711 the process receives a notification request. In some embodiments the notification request is the notification request discussed with respect to block 311 of the process of FIG. 3, and in some embodiments the notification request is additionally processed as discussed with respect to FIG. 3, or the other Figures. The notification request may be made by a user, who may for example be uniquely identified by a game player identifier or by some other unique identifier. In some embodiments notification request is a request for notification of participation of particular players in play of a video game, and in some embodiments play of a particular video game or play of a particular mode or map of a particular video game. In some embodiments the request for notification of participation of particular players in play of the particular video game may specify whether the particular players are to be in competition with each other, or in a cooperative relationship with one another, or either. In any such case, such play of such a game would be play of a video game match involving the particular players.

In many embodiments the process may receive many such notification requests, for example from many different users, some of whom may provide a notification request for notification of the same video game match. In block 713 the process updates information indicating a number of requests for notification of play of the video game match involving the particular players. In some embodiments the information may be stored in a table, as records in a database, or some other format.

In block 715 the process provides the information indicating a number of requests for notification of play of the video game match involving the particular players to a matchmaking server or module. In some embodiments the process in addition or instead sends a notification to the particular players indicating the number of requests for notifications submitted for a video game match in which the particular players participate. In some embodiments the process in addition or instead provides access to information, for example in a table available on a webpage over the Internet or accessible from a gaming platform executing program instructions for the video game, indicating most requested video game play matches, which may include the video game play match for which the user requested notification.

In block 717 the matchmaking server utilizes the number of requests for notification of play of the video game match involving the particular players. In various embodiments the matchmaking server may utilize various criteria in matching players to play in a video game match. The criteria may include, in various embodiments, some or all of player skill level, player gaming platforms, Internet distance between players, and many other factors. These criteria may be used in a weighing function, for example, with different weights applied to different criteria, in determining players to play in a video game. In some embodiments the matchmaking server may utilize the number of requests for notification of play of the video game match involving the particular players as one such criteria. In other embodiments, however, the matchmaking server may use of requests for notification of play of the video game match involving the particular players as a deciding criteria, for example if the number of requests for notification exceeds a predetermined number.

The process thereafter returns.

Figure 8:
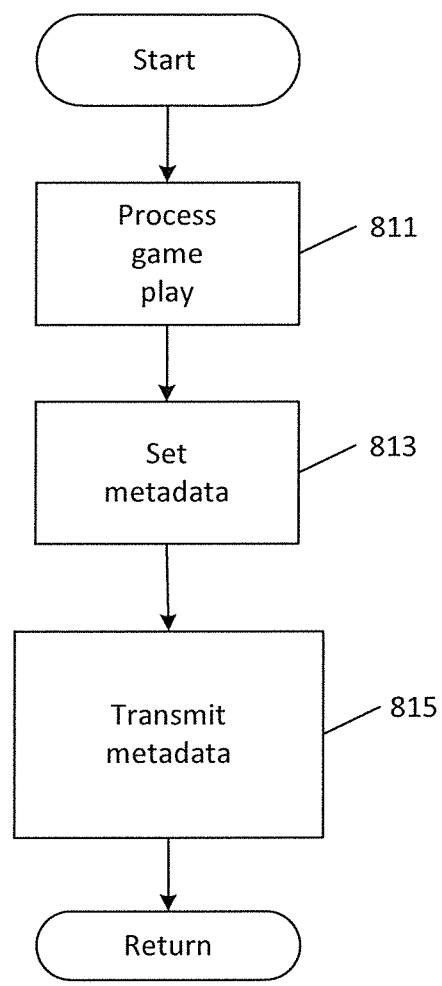
FIG. 8 is a flow diagram of a process for providing metadata regarding game play states in accordance with aspects of the invention.

FIG. 8 is a flow diagram of a process for providing metadata regarding game play states in accordance with aspects of the invention. In some embodiments the process is performed by the system of FIG. 1. In some embodiments the process is performed by a game server or a gaming platform of the system of FIG. 1. In some embodiments the process or parts of the process is performed by a processor executing program instructions, for example a processor of a game server or gaming platform of the system of FIG. 1.

In block 811 the process processes play of a video game. In some embodiments processing of play of the video game is performed by a gaming platform. In various embodiments a processor of the gaming platform processes user inputs to the gaming platform for use in control of a virtual character in and interacting with a virtual world, with a state of the virtual character and, in some embodiments the virtual world, reflected by game state information determined by the processor. In some embodiments processing play of the video game is performed by a game host. The game host may, for example, receive game state information from one or more gaming platforms engaged in play of the video game, which may be a multiplayer video game, and distribute changed game state information amongst the gaming platforms or, in some embodiments, provide altered game state information to a one of the gaming platforms, for example in embodiments in which the game host also modifies game state information.

In block 813 the process sets metadata information based on the game state information. In some embodiments the metadata information is in the form of flags indicating a mission, a character level, a number of players, an amount of remaining life, an amount of remaining time, or a score differential of the video game. In some embodiments the metadata information is set by the gaming platform, for example as or substantially as game states change, and in some embodiments may be set by the gaming platform during operations of block 811. In some embodiments the metadata information is set by the game host, for example as the game host is in the process of distributing game state information, and in some embodiments may be set by the game host during operations of block 811.

In block 815 the process transmits the metadata information. In some embodiments the metadata information is transmitted to a notification server, or some other server. In most embodiments, information regarding or indicating an identification of the video game and the game host for the video game are also provided with the metadata information The process thereafter returns. In various embodiments the process may return to operations of block 811.

Figure 9:
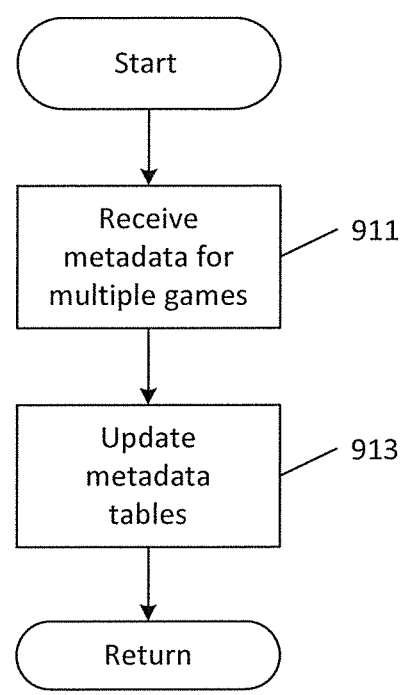
FIG. 9 is a flow diagram of a process for updating searchable tables of current game play states in accordance with aspects of the invention.

FIG. 9 is a flow diagram of a process for updating searchable tables of current game play states in accordance with aspects of the invention. In some embodiments the process is performed by the system of FIG. 1. In some embodiments the process is performed by the notification server of FIG. 1 or FIG. 2, or some other server. In some embodiments the process or parts of the process is performed by a processor executing program instructions, for example a processor of a server of the system of FIG. 1.

In block 911 the process receives metadata information for multiple video games. In some embodiments the metadata information may be the metadata information transmitted in operations 815 of the process discussed with respect to FIG. 8. In various embodiments the metadata may comprise flags indicating missions, character levels, numbers of players, amounts of remaining life, amounts of remaining time, or score differentials of the various video games. In most embodiments, information regarding or indicating an identification of the video game and the game host for the video game are also received with the metadata information.

In block 913 the process updates a database or tables, or some other searchable data construct, with the metadata information.

The process thereafter returns.

Figure 10:
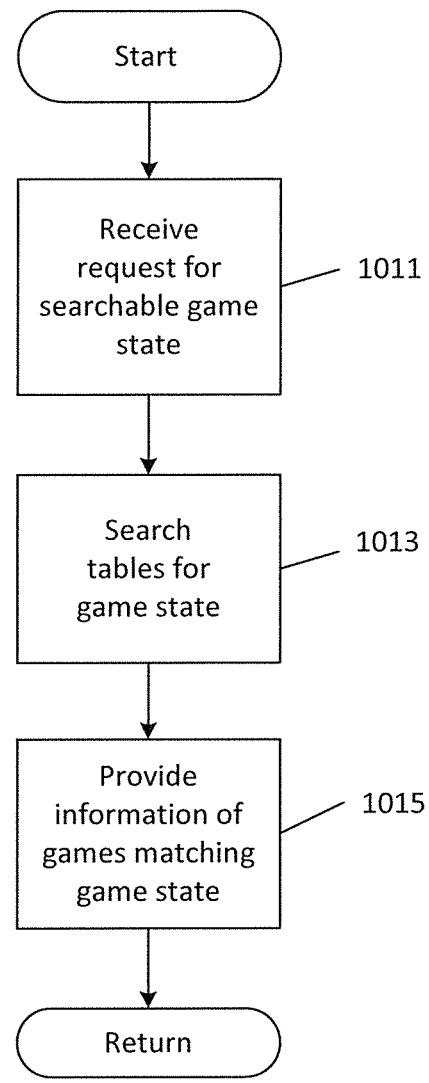
FIG. 10 is a flow diagram of a process for providing information regarding video games which match a requested game play state in accordance with aspects of the invention.

FIG. 10 is a flow diagram of a process for providing information regarding video games which match a requested game play state in accordance with aspects of the invention. In some embodiments the process is performed by the system of FIG. 1. In some embodiments the process is performed by the notification server of FIG. 1 or FIG. 2, or some other server. In some embodiments the process or parts of the process is performed by a processor executing program instructions, for example a processor of a server of the system of FIG. 1.

In block 1011 the process receives a request for video games matching a game state. In various embodiments the game state may only be one of a plurality of predetermined game states, or a combination of various ones of a plurality of predetermined game states. In some embodiments the game states comprise some or all of missions, character levels, numbers of players, amounts of remaining life, amounts of remaining time, or score differentials of various video games. In some embodiments the request may be from a gaming platform. In some embodiments the request may be from any computing device coupled to the Internet. In most embodiments the request also identifies an identity of a user using the requesting device, or an identity of the requesting device.

In block 1013 the process searches a database, table, or other searchable data construct for video games with the matching game state. In some embodiment the database, table, or other searchable data construct may be those as discussed with respect to operations of block 913 of the process discussed with respect to FIG. 9.

In block 1015 the process provides information of games matching the requested game states. In some embodiments the process provides the information to the requesting device. In some embodiments the process additionally provides information pertaining to viewing of play of the video game to the requesting device.

The process thereafter returns.

Although the invention has been discussed with respect to various embodiments, it should be recognized that the invention comprises the novel and non-obvious claims supported by this disclosure.

What is claimed is:

1. A method of providing notifications to users of occurrence of video game play events, comprising:

receiving, by at least one server of one or more servers, a plurality of requests for notification of occurrence of video game play events from a plurality of devices of a plurality of requestors, each of the requests for notification specifying a video game play event and including an identification of the requestor making the request;

storing, by at least one server of the one or more servers, information of the requests for notification of occurrence of video game play events;

determining, by at least one server of the one or more servers, whether information regarding play of a plurality of video games on a plurality of game servers matches the information of the requests for notification of occurrence of video game play events; and in response to determining the existence of a match, providing, by at least one server of the one or more servers, a notification comprising an identifier of the matched video game play event to particular ones of the plurality of devices corresponding to requestors making a request for the matched video game play event.

2. The method of claim 1, wherein the notification includes information allowing the requestor to view a live stream of play of the video game via the game server for which the match occurs.

3. The method of claim 1, wherein the plurality of requests for notification are received by a first server of the one or more servers, with the first server receiving the information regarding play of the plurality of video games from a second server of the one or more servers.

4. The method of claim 3, wherein the second server is a matchmaking server.

5. The method of claim 3, wherein the second server comprises the plurality of game servers.

6. The method of claim 5, wherein the information regarding play of the plurality of video games comprises game state information generated during play of the video games and wherein the notification comprises the game state information.

7. The method of claim 1, wherein the plurality of requests for notification are received by a first server of the one or more servers, the method further comprising providing at least some of the information of the requests for notification of occurrence of video game play events to a second computer device of the plurality of devices, and wherein the second computer device determines whether information regarding play of the plurality of video games matches the information of the requests for notification of occurrence of video game play events.

8. The method of claim 7, wherein the second computer device comprises a game server serving as a game host for play of the video game.

9. The method of claim 7, wherein the second computer device comprises a gaming platform serving as a game host for play of the video game.

10. The method of claim 1, further comprising determining, by at least one server of the one or more servers, a number of requests for notification of play of a particular video game by particular game players.

11. The method of claim 10, further comprising providing, by at least one server of the one or more servers, the number of requests for notification of play of the particular video game by the particular game players to a matchmaking server or module, for use in matching the particular game players for play of the particular video game.

12. A method of providing notifications to users of video games in particular states, comprising:

receiving information indicative of video game states for a plurality of video games from at least one game server during a period of time during which the video games are being played;

receiving requests from a plurality of devices of a plurality of users for video games being played that match requestor criteria;

determining, using a notification server, whether the information indicative of video game states for any of the plurality of video games match the requestor criteria of any of the requests; and providing a notification to particular ones of the plurality of devices of the video games being played that match the predetermined criteria, wherein the notification allows the particular ones of the plurality of devices to view live streams of the video games being played.

13. The method of claim 12, wherein the information indicative of video game states comprises one or more flags indicating a state of the video game.

14. The method of claim 12, wherein the notification is configured to allow at least one of the plurality of devices to view a live stream of at least one of the video games being played, wherein the at least one of the plurality of devices comprises at least one of a smartphone, a tablet, and a personal computer, and wherein the at least one of the video games being played comprises a game being played on a videogame console.

15. The method of claim 14, wherein the one or more servers comprises a notification server and a game play server.

16. A method of providing notifications to users of occurrence of video game play events, comprising:

receiving, by at least one server of one or more servers, a plurality of requests for notification of occurrence of video game play events from a plurality of devices of a plurality of requestors, each of the requests for notification specifying a video game play event and including an identification of the requestor making the request;

storing, by at least one server of the one or more servers, information of the requests for notification of occurrence of video game play events on a notification server;

determining, by at least one server of the one or more servers, a number of the requests for notification specifying play of a particular video game by particular game players as the video game play event;

providing, by at least one server of the one or more servers, the number of requests for notification of play of the particular video game by the particular game players to a matchmaking server or module, for use in matching the particular game players for play of the particular video game;

determining, by at least one server of the one or more servers, whether information of the one or more servers regarding play of a plurality of video games matches the information of the requests for notification of occurrence of video game play events;

in response to determining the existence of a match, providing, by at least one server of the one or more servers, a notification comprising an identifier of the matched video game play event to particular ones of the plurality of devices corresponding to requestors making a request for the matched video game play event.

17. The method of claim 16, wherein the one or more servers comprises a notification server.

* * * * *